(12) United States Patent
Byrne

(10) Patent No.: US 7,387,144 B2
(45) Date of Patent: Jun. 17, 2008

(54) TIRE HAVING A TEXTURED MARKING AND METHOD OF MAKING SAME

(75) Inventor: Francis J. Byrne, Medina, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 312 days.

(21) Appl. No.: 11/067,424

(22) Filed: Feb. 25, 2005

(65) Prior Publication Data

US 2006/0191617 A1   Aug. 31, 2006

(51) Int. Cl.
*B60C 13/00* (2006.01)
*B29D 30/72* (2006.01)

(52) U.S. Cl. ............... 152/523; 152/524; 152/525; 156/116; 156/130.7; 156/279

(58) Field of Classification Search ........ 152/523–525, 152/DIG. 12; 156/116, 279, 130.7
See application file for complete search history.

(56) References Cited

U.S. PATENT DOCUMENTS

| | | | |
|---|---|---|---|
| 4,256,159 A | 3/1981 | Williams | |
| 4,461,795 A | 7/1984 | Ogawa | |
| 4,767,481 A | 8/1988 | Bryant et al. | |
| 5,047,110 A | 9/1991 | Bryant et al. | |
| 5,263,525 A | 11/1993 | Yamashita | |
| 5,300,164 A | 4/1994 | DeTrano et al. | |
| 5,315,764 A | 5/1994 | Robbins | |
| 5,358,772 A | 10/1994 | Nakagawa et al. | |
| 5,371,136 A * | 12/1994 | Brooks et al. | ............... 524/526 |
| 5,628,956 A * | 5/1997 | Theusner et al. | ........... 264/438 |
| 5,645,661 A | 7/1997 | Clementz et al. | |
| 5,728,242 A | 3/1998 | Barrese et al. | |
| 5,992,487 A | 11/1999 | Adachi | |
| 6,032,711 A | 3/2000 | Barrese et al. | |
| 6,053,228 A | 4/2000 | Baker | |
| 6,062,283 A | 5/2000 | Watanabe et al. | |
| 6,391,134 B1 | 5/2002 | Lipovac | |
| 6,397,912 B1 | 6/2002 | Watanabe et al. | |
| 6,612,352 B1 | 9/2003 | Barrese et al. | |
| 2002/0066513 A1 | 6/2002 | Roesgen et al. | |
| 2003/0211273 A1 | 11/2003 | Perry et al. | |
| 2004/0067304 A1 * | 4/2004 | Daly et al. | ................... 427/180 |
| 2004/0095244 A1 | 5/2004 | Conwell et al. | |
| 2004/0103974 A1 | 6/2004 | Majumdar et al. | |

FOREIGN PATENT DOCUMENTS

| | | | | |
|---|---|---|---|---|
| DE | 3740303 A1 * | 6/1989 | ................ | 152/525 |
| JP | 52-136228 A * | 11/1977 | | |

* cited by examiner

*Primary Examiner*—Geoffrey L Knable
(74) *Attorney, Agent, or Firm*—Steven M. Auvil; Thomas R. Kinsbury

(57) ABSTRACT

A tire is provided with at least one textured marking on an outer surface of a sidewall of the tire. The at least one textured marking includes crumb rubber adhered to the sidewall of the tire.

13 Claims, 5 Drawing Sheets

TIRE HAVING A TEXTURED MARKING AND METHOD OF MAKING SAME

FIELD OF INVENTION

The present application is directed to a tire having markings or indicia provided thereon. More particularly, the present application is directed to a tire having a textured marking and a method of making the textured marking on the tire.

BACKGROUND

Tires typically include markings or indicia on the sidewalls. Indicia can include, for example, letters, numbers, symbols, designs etc. The indicia can help identify the manufacturer of the tire by including the manufacturer's name and/or trademark, the size of the tire, and/or other information. Often, the indicia is difficult to discern on the black background of the tire sidewall. Tire manufacturers have endeavored to increase the visibility of the indicia on the sidewall of tires using numerous techniques.

One technique for increasing the visibility of the indicia on the tire sidewall involves raising or lowering at least a portion of the indicia from the cavity line of the sidewall. This technique is typically accomplished by molding the indicia in relief on the sidewalls of a tire, thereby creating embossed or engraved indicia.

Another technique for increasing the visibility of the indicia on the tire sidewall involves the use of colored indicia. Colored indicia (normally white such as a white sidewall) set on a black tire background increases the visibility of the indicia. The use of colored indicia, however, can complicate the manufacturing process. In addition, tires with colored indicia tend to require increased maintenance from the tire owner as compared to tires without colored indicia.

Yet another technique for increasing the visibility of the indicia on the tire sidewall involves using serrations, or texture. The serrations can change the amount of light reflected or deflected from the tire sidewall. The variation in light reflection or deflection enhances the visibility of the indicia.

SUMMARY

A tire that includes at least one textured marking provided on an outer surface of a sidewall of the tire. The at least one textured marking includes crumb rubber adhered to the sidewall of the tire.

A method of improving visibility of at least one existing marking provided on a sidewall of a tire is provided. The method includes applying an adhesive to or within at least a portion of the at least one existing marking and applying crumb rubber to the adhesive.

A textured label for use on a sidewall of a tire is provided. The label includes a film substrate having a first surface and a second surface; a first adhesive layer in direct contact with the first surface of the film substrate; a second adhesive layer having a first surface and a second surface wherein the first surface of the second adhesive layer is in direct contact with the second surface of the film substrate and the second surface of the second adhesive layer is configured to adhere the label to the tire; and a crumb rubber layer in direct contact with the first adhesive layer.

BRIEF DESCRIPTION OF THE DRAWINGS

In the accompanying drawings, embodiments of a tire, label, and method are illustrated, which, together with the detailed description given below, serve to describe example embodiments of the mechanism and method. It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as a single element. An element shown as an internal component of another element may be implemented as an external component and vice-versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially," as used herein, refer to a direction that is parallel to the axis of rotation of a tire.

"Circumferential" and "circumferentially," as used herein, refer to a direction extending along the perimeter of the surface of the annular tread perpendicular to the axial direction.

"Groove," as used herein, refers to an elongated void area in the tread that extends circumferentially in a straight, curved or zig-zag manner.

"Lateral," as used herein, refers to a direction along the tread of the tire going from one sidewall of a tire to the other sidewall.

"Radial" and "radially," as used herein, refer to a direction perpendicular to the axis of rotation of a tire.

"Sidewall," as used herein, refers to that portion of the tire between the tread and the bead.

"Slot" as used herein, refers to an elongated void area in the tread that extends laterally in a straight, curved or zig-zag manner.

"Tread," as used herein, refers to that portion of the tire that comes into contact with the road under normal inflation and load.

Figure 1:
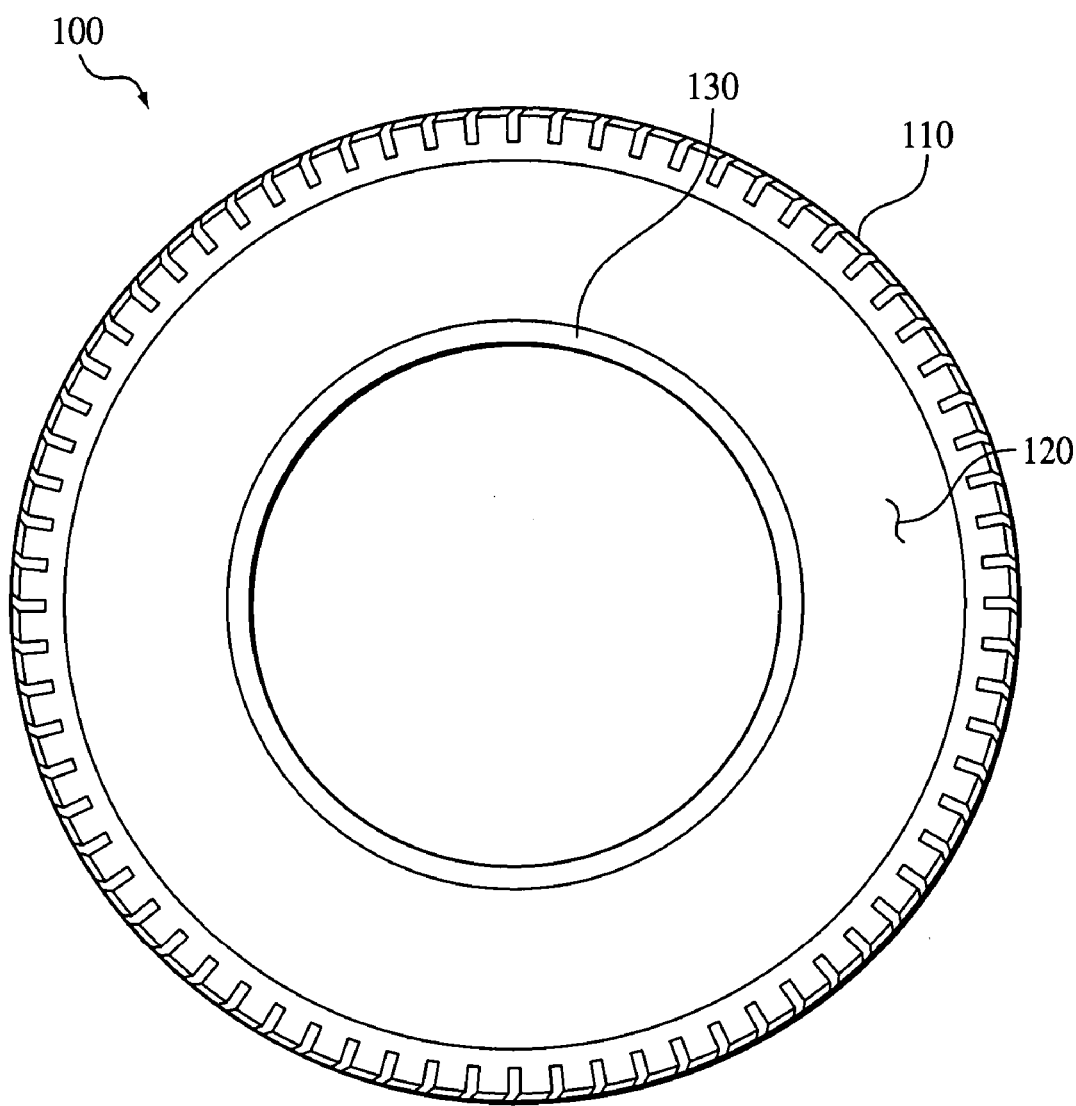
FIG. 1 illustrates an elevational schematic view of a conventional tire 100.

Illustrated in FIG. 1 is an elevational schematic view of a conventional tire 100. The tire 100 is provided with a tread area 110, an outer sidewall area 120, and an outer bead 130. By "outer," it is understood to mean the side of the tire 100 that is visible when mounted upon a vehicle. It will be appreciated that all tires also have an inner sidewall (not shown) and an inner bead (not shown). The outer bead 130 defines an opening for receiving a wheel (not shown) and the outer sidewall 120 extends between and joins the tread area 110 and the outer bead 130.

Figure 2:
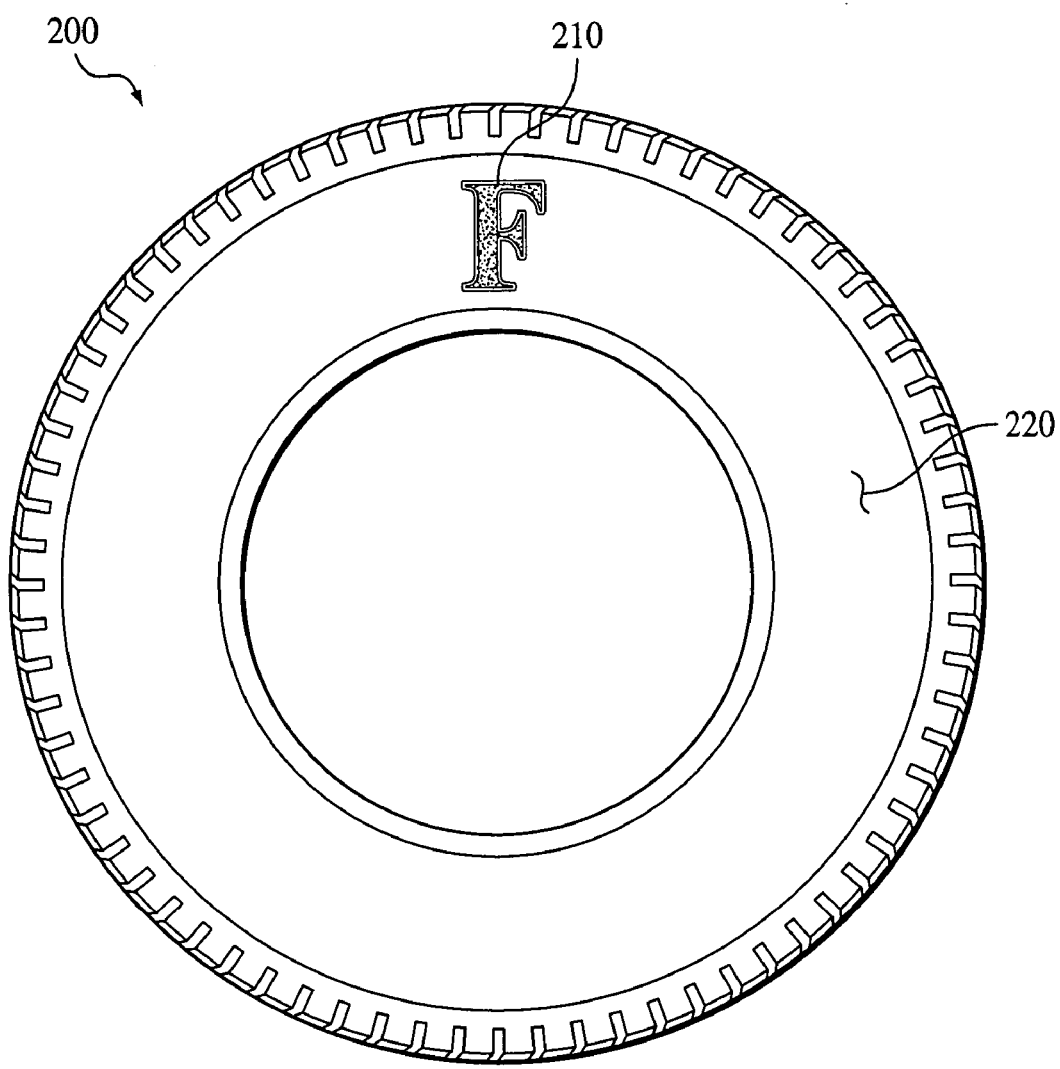
FIG. 2 illustrates an elevational schematic view of one embodiment of a tire 200 with a textured marking 210 provided on a sidewall 220 of the tire 200.

Illustrated in FIG. 2 is an elevational schematic view of one embodiment of a tire 200 with a textured marking 210 provided on a sidewall 220 of the tire 200. By providing a textured marking 210 on the sidewall 220 of the tire 200, the visibility of the marking can be improved. The textured marking 210 can take the form of, for example, a letter, numeral, symbol, logo, trademark, ornamental design, decorative pattern, and any combination thereof.

In one embodiment, crumb rubber can be adhered to the sidewall 220 of the tire 200 to form the textured marking 210. For example, the crumb rubber can be adhered to the sidewall 220 of the tire 200 with an adhesive. Suitable adhesives can include, without limitation, pressure sensitive adhesives, hot melt adhesives, contact cement, epoxies (single part or multiple parts), double-sided tape, or any other means capable of adhering crumb rubber to vulcanized rubber.

In one embodiment, an adhesive layer can be disposed between the outer surface of the sidewall 220 and the crumb rubber. In an alternative embodiment, the adhesive and crumb rubber can be combined to form a mixture (e.g., a paste) that can be applied to the sidewall of the tire.

Crumb rubber, which can also be referred to as "powered rubber" or "ground rubber," may be derived from a variety of rubber materials. For example, the rubber materials can include natural rubbers, synthetic rubbers, and combinations thereof. Specific nonlimiting examples of suitable synthetic rubbers can include styrene/butadiene (SB) copolymers, styrene butadrene styrene (SBS) copolymers, styrene butadiene rubber (SBR), polyisoprenes, polychloroprenes, polybutadienes, ethylene-propylene copolymers, acrylonitrile/butadiene copolymers, ethylene/vinyl acetate copolymers, and combinations thereof.

Crumb rubber can be produced from recycling the sidewall or other appropriate components of vulcanized rubber tires. The use of a recycled component in the tire is desirable from an ecological point of view. Various size reduction techniques can be used to achieve a wide range of particle sizes. Two of the most common size reduction techniques are mechanical grinding and cryogenic reduction, which are both well known in the art.

Alternatively, crumb rubber can be a byproduct of the final trimming and uniformity grading of a tire after it is removed from a vulcanization mold. In this process, the tire can be optimized to a desired uniformity using grinders to remove small particles of rubber.

Crumb rubber is available in a variety of particle sizes. For example, the major dimension of the crumb rubber particles, which are typically irregularly shaped, can be between about 0.075 mm and about 4.5 mm. Crumb rubber can also be characterized in terms of mesh size. For example, crumb rubber can have a particle size between 5 mesh and 200 mesh, which means that crumb rubber can pass through a sieve of 5 to 200 meshes per inch. When characterized in terms of mesh size, the larger the mesh number, the smaller the particle diameter.

The particle size of the crumb rubber can affect the surface quality (e.g., roughness or smoothness) of the textured marking 210. For example, as the particle size of the crumb rubber increases, the roughness of the textured marking increases. Conversely, as the particle size of the crumb rubber decreases, the roughness of the textured marking decreases.

To enhance the visibility of the textured marking 210, the textured marking 210 and the sidewall 220 of the tire can differ in luster. For example, the molded sidewall 220 of the tire 200 can be black in color and have a high luster, while the textured marking 210 (which includes crumb rubber) can be black in color and have a very low luster (it absorbs more of the incoming light that is lost between the particles of rubber) than the luster of the sidewall 220 (which has a flat, normally polished surface, from the tire mold). This difference in luster can provide significant contrast between the textured marking 210 and the sidewall 220, thereby improving visibility of the textured marking 210. Of course, it will be appreciated that the luster levels of the sidewall 220 of the tire and the textured marking 210 can be reversed to create the desired contrast (e.g., the crumb rubber can be a "super" black having a very high luster in comparison to the sidewall of the tire).

Alternatively, the textured marking 210 and the sidewall 220 of the tire 200 can also differ in color to enhance the visibility of the textured marking 210. For example, the color of the sidewall 220 of the tire 200 can be black, while the color of the textured marking 210 can be white, providing sufficient contrast to enhance visibility of the marking. Obviously, the textured marking 210 and the sidewall 220 of the tire 200 can be any two different colors so long as there is a visible difference between the two colors.

In one embodiment, an existing marking provided on a sidewall of a tire can be textured using crumb rubber to improve its visibility. By "existing marking," it is understood to mean a marking (e.g., a letter, numeral, symbol, logo, trademark, ornamental design, decorative pattern, and any combination thereof) that is normally molded in relief on the sidewalls of a tire at the time of the finish molding thereof in a vulcanizing mold.

Figure 3:
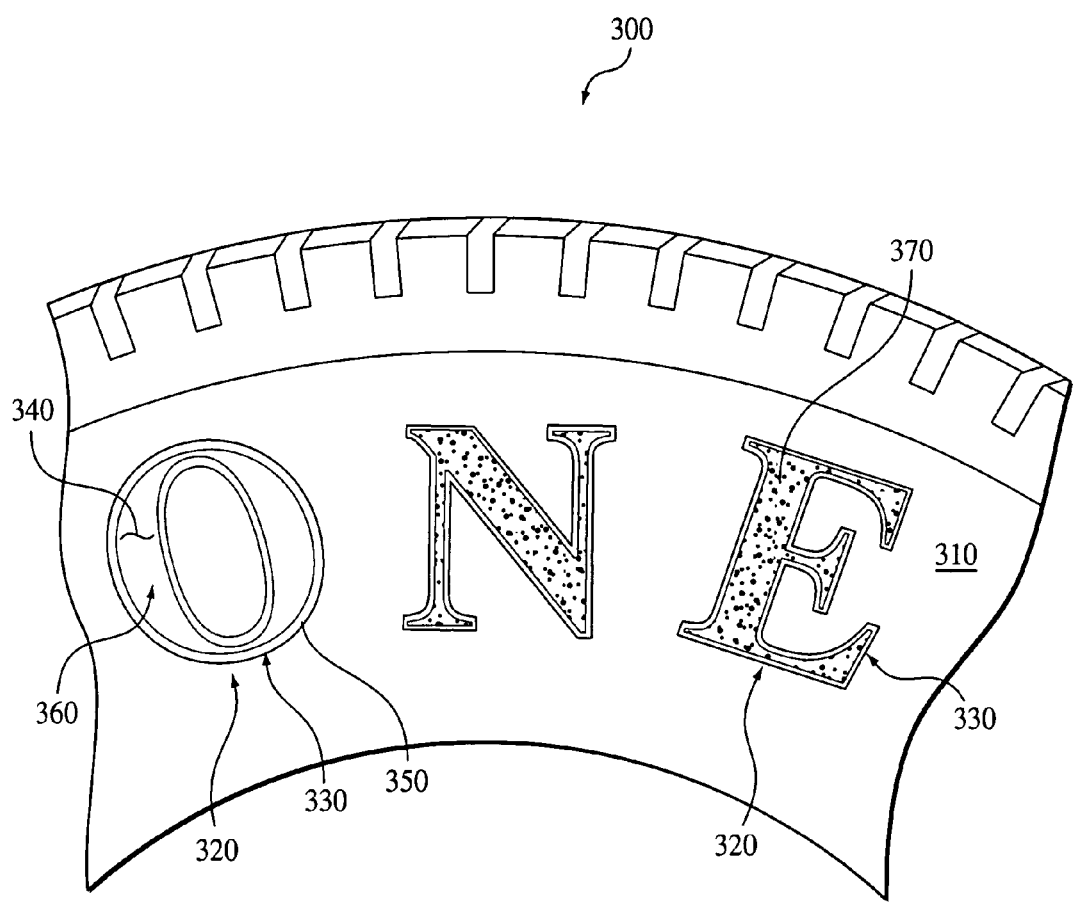
FIG. 3 illustrates is an elevational view of one embodiment of a tire having a sidewall 310 with partially raised markings 320 provided thereon.

Illustrated in FIG. 3 is one embodiment of a tire 300 having a sidewall 310 with existing markings 320 provided thereon. In this embodiment, the existing marking 320 can include an outline portion 330 and an inner portion 340. The outline portion 330 protrudes from an outer surface of the sidewall 310 and extends along the perimeter of the inner portion 340. The outline portion 330 is provided with a top surface 350, while the inner portion 340 has a generally smooth bottom surface 360 indented from the top surface 350 of the outline portion 330. It will be appreciated that the bottom surface 360 of the inner portion 340 may also be the same surface as the outer surface of the sidewall 310. Optionally, the bottom surface 360 of the inner portion 340 can be provided with serrations to improve the adherence of the crumb rubber thereto and/or improve worn appearance of the crumb rubber.

In one embodiment, crumb rubber 370 can be adhered to the bottom surface 360 of the inner portion 340 of the existing marking 320 within the outline portion 330 of the existing mark 320 as shown in FIG. 3. By providing crumb rubber 370 within the outline portion 330 of the existing mark 320, the protruding walls of the outline portion 330 of the existing mark 320 can protect the crumb rubber 370. Of course, it will be appreciated that the crumb rubber 370 can also be adhered b both the outline portion 330 and the inner portion 340 of the existing marking 320 or portions thereof.

Figure 4:
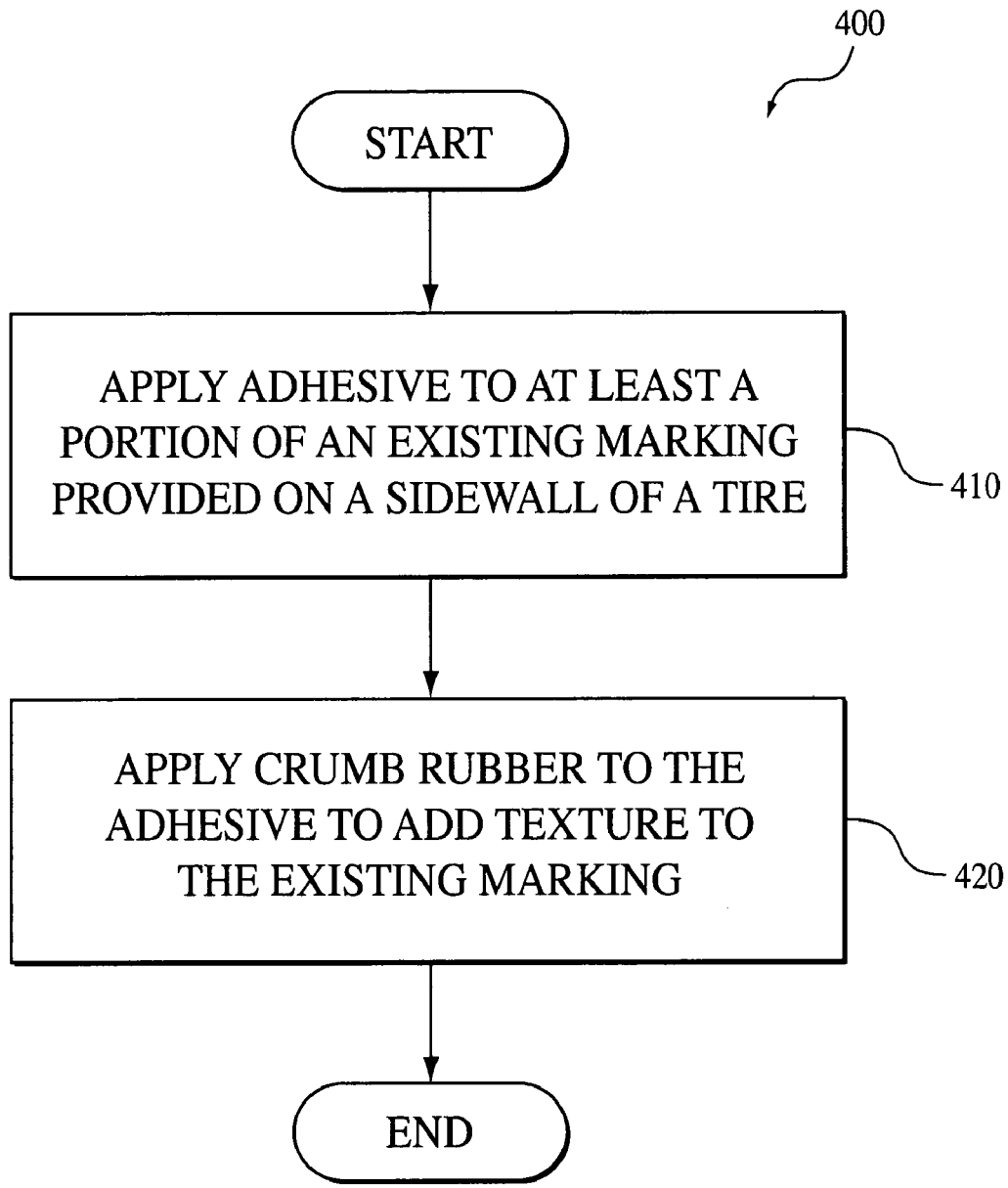
FIG. 4 illustrates one embodiment of a methodology 400 associated with improving the visibility of an existing marking provided on a sidewall of a tire.

Illustrated in FIG. 4 is one embodiment of a methodology associated with improving the visibility of an existing marking provided on a sidewall of a tire. The illustrated elements denote "processing blocks" and represent functions and/or actions taken to implement this methodology. It will be appreciated that the methodology may involve dynamic and flexible processes such that the illustrated blocks can be performed in other sequences different than the one shown and/or blocks may be combined or, separated into multiple components.

With reference to FIG. 4, the process 400 includes applying an adhesive to at least a portion of an existing marking that is provided on a sidewall of a tire (block 405). The existing marking provided on the sidewall of the tire can be, for example, formed in a tire mold during vulcanization of the tire. The adhesive can be applied to the sidewall of the tire utilizing any of a variety of existing technologies. Suitable technologies to apply the adhesive to the sidewall of the tire include, but are not limited to: 1) ink jet technologies; 2) silk screening technologies; 3) automated fluid or gel dispensing technologies; 4) other fluid or gel dispensing technologies known in the art; 5) manual application, or 6) adhesive tape or substrate.

Figure 5A:
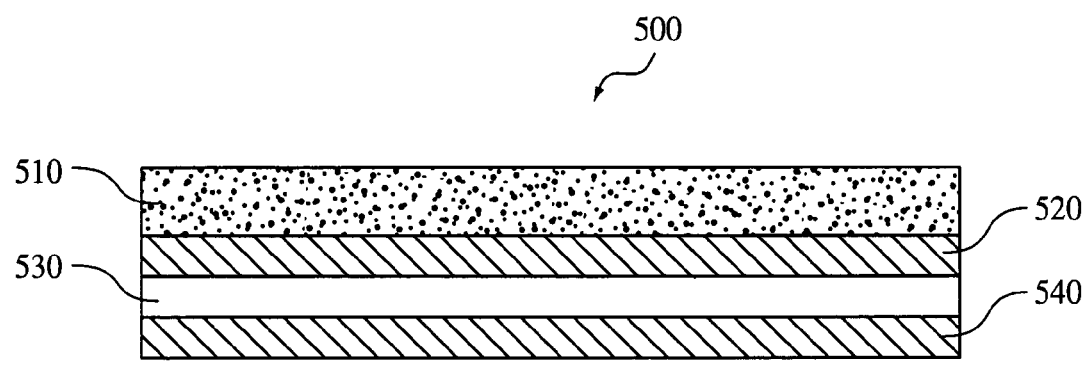
FIG. 5A illustrates a cross-sectional view of one embodiment of a textured label 500 for use on a sidewall of a tire.
Figure 5B:
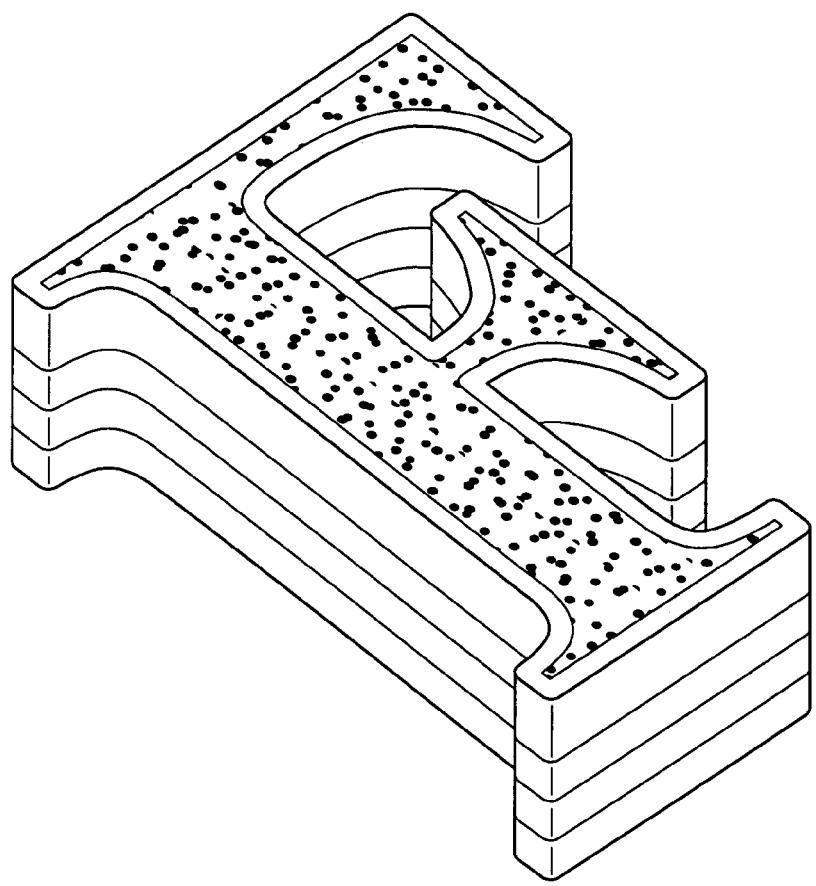
FIG. 5B illustrates a perspective view of the textured label 500 illustrated in FIG. 5A in the form of the letter "F."

After the adhesive is applied to the marking, the process 400 can include applying crumb rubber to the adhesive (block 410). The crumb rubber that is applied to the adhesive can add texture to or within the existing marking provided on the sidewall of the tire. In one example methodology, the crumb rubber can be applied to the adhesive utilizing any of a variety of existing technologies such as an electrostatic flocking process. The electro-static flocking process can attract the crumb rubber to the adhesive and align the crumb rubber particles. Other suitable technologies to apply the crumb rubber to the adhesive include, but are not limited to: 1) mechanical flocking technologies; 2) automated particulate dispensing technologies; 3) other particulate dispensing technologies known in the art; or 4) manual application Illustrated in FIGS. 5A and 5B is a cross-sectional view and perspective view, respectively, of one embodiment of a textured label 500 for use on a sidewall of a tire. As shown in FIG. 5B, the label 500 can take the form of the letter "F." Obviously, it will be appreciated that the label 500 can take the form of another letter or any desired shape or configuration. For example, the label can take the form of a numeral, symbol, logo, word, trademark, ornamental design, decorative pattern, or any combination thereof.

In one embodiment, the label 500 can include a crumb rubber layer 510 in direct contact with one surface of a first adhesive layer 520, a film substrate 530 in direct contact with the other surface of the first adhesive layer 520, and a second adhesive layer 540 in direct contact with the film substrate 530. By "in direct contact," it is understood to mean that the layers are in adhering contact with one another (e.g., as a coating is in contact with its substrate, with the understanding that the strength of the contact or, in other words, the strength of the adhesiveness of one layer to the other will vary with the composition of the layers and the method of their joining).

The crumb rubber layer 510 can include, for example, substantially the same crumb rubber as described above. Moreover, the crumb rubber layer 510 and the sidewall of the tire (for which the label 500 may be applied to) can differ in luster and/or color as described above.

The first and second adhesive layers 520, 540 can include, for example, substantially the same adhesive as described above. However, it will be appreciated that the first and second adhesive layers 520, 540 can include the same adhesive or different adhesives.

The film substrate 530 can be, for example, constructed of a resin material such as polyester. Examples of other suitable resin materials that can be used for the film substrate 530 include, without limitation, ABS, polyarylate, polycarbonate, polyamide, polyimide, polyamidoimide, polyacetal, polyphenylene oxide, polysulfone, polyethersulfone, polyphenylene sulfide, polyether ether ketone, and polymers or polymer alloys containing one or more of these materials.

Optionally, a release liner can be applied to the second adhesive layer to protect the adhesive until the label 500 is ready for application to a tire. Examples of suitable materials that can be used for the release liner include, without limitation, silicone-coated glassine paper, laminated paper, polyester film, and polypropylene film.

In use, the release liner (if present) can be removed from the label 500 and the label 500 can be applied to the sidewall of a tire. Since the crumb rubber layer 510 differs in luster and/or color from the sidewall of the tire, the visibility of the label 500 can be improved.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A tire having at least one existing marking provided on a sidewall of the tire, the at least one existing marking including an inner portion and a raised outline portion that extends along the perimeter of the inner portion, the tire comprising:
    crumb rubber disposed on or within the inner portion of the at least one existing marking to add texture thereto, to thereby improve visibility of the at least one existing marking relative to other areas of the sidewall not provided with crumb rubber.

2. The tire of claim 1 wherein the at least one existing marking includes one or more of, a letter, numeral, symbol, logo, word, trademark, ornamental design, decorative pattern, and any combination thereof.

3. The tire of claim 1 wherein the bottom surface of the inner portion being provided with serrations to improve the adhesion of the crumb rubber thereto.

4. The tire of claim 1 wherein the crumb rubber is disposed substantially on the inner portion of the at least one existing marking within the outline portion of the at least one marking.

5. The tire of claim 1 wherein the crumb rubber disposed on or within the existing marking and the other areas of the sidewall not provided with crumb rubber differ in one or more of, luster and color.

6. A method of improving visibility of at least one existing marking provided on a sidewall of a cured tire, the method comprising:

selectively applying an adhesive to or within at least a portion of the at least one existing marking on the sidewall of the cured tire; and applying crumb rubber to the adhesive to add texture to or within the at least one existing marking, thereby improving the visibility of the at least one marking relative to other areas of the sidewall not provided with crumb rubber.

7. The method of claim 6 wherein the adhesive is selectively applied to the sidewall of the tire within the at least one existing marking.

8. The method of claim 6 wherein the adhesive is selectively applied to or within the at least one existing marking through the use of an ink jet process.

9. The method of claim 6 wherein the adhesive is selectively applied to or within the at least one existing marking through the use of a silk screening process.

10. The method of claim 6 wherein the crumb rubber is applied to the adhesive through the use of an electro-static flocking process.

11. The method of claim 10 wherein the electro-static flocking process attracts and aligns the crumb rubber to the adhesive.

12. The method of claim 6 wherein the crumb rubber has a different luster than the other areas of the sidewall not provided with crumb rubber.

13. The method of claim 6 wherein the crumb rubber has a different color than the other areas of the sidewall not provided with crumb rubber.

* * * * *